(12) United States Patent
Herrero

(10) Patent No.: US 10,015,209 B2
(45) Date of Patent: Jul. 3, 2018

(54) RATE CONTROL FOR DATA TRANSMISSION USING A TUNNEL

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 171 days.

(21) Appl. No.: 14/799,996

(22) Filed: Jul. 15, 2015

(65) Prior Publication Data

US 2017/0019433 A1    Jan. 19, 2017

(51) Int. Cl.
*H04L 29/06* (2006.01)
*H04L 12/823* (2013.01)
*H04L 12/801* (2013.01)
*H04L 12/853* (2013.01)

(52) U.S. Cl.
CPC .......... *H04L 65/1069* (2013.01); *H04L 47/19* (2013.01); *H04L 47/2416* (2013.01); *H04L 47/32* (2013.01)

(58) Field of Classification Search
None
See application file for complete search history.

(56) References Cited

U.S. PATENT DOCUMENTS

| | | | | |
|---|---|---|---|---|
| 2005/0157646 A1* | 7/2005 | Addagatla | ............... | H04L 47/10 370/232 |
| 2005/0182833 A1* | 8/2005 | Duffie, III | .......... | H04L 12/5693 709/224 |
| 2008/0247326 A1* | 10/2008 | Cormier | .............. | H04L 63/0272 370/252 |
| 2009/0086705 A1* | 4/2009 | Zisimopoulos | ... | H04W 72/1268 370/347 |
| 2010/0189063 A1* | 7/2010 | Kokku | .................... | H04L 47/10 370/329 |
| 2012/0201144 A1* | 8/2012 | Cormier | .............. | H04L 63/0272 370/241 |
| 2013/0283037 A1* | 10/2013 | Katz | ....................... | H04L 63/04 713/151 |

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).*
H. Schulzrinne et al.; "RTP: A Transport Protocol for Real-Time Applications";Jul. 2003; 89 pages.

* cited by examiner

*Primary Examiner* — Charles C Jiang
*Assistant Examiner* — Saad Khawar
(74) *Attorney, Agent, or Firm* — Potomac Law Group, PLLC

(57) ABSTRACT

A system that performs rate control for real-time communications ("RTC") establishes a tunnel by a tunneling server with a tunneling client of a user equipment ("UE"). The system receives a request from the UE to enable the rate control for an inner socket of the tunnel, and sends a response back to the UE to indicate that the rate control is enabled for the inner socket. The system then monitors a transmission rate at the inner socket of the tunnel, and drops frames when the monitored transmission rate is greater than a predetermined transmission rate.

20 Claims, 5 Drawing Sheets

RATE CONTROL FOR DATA TRANSMISSION USING A TUNNEL

FIELD

One embodiment is directed generally to a communications network, and in particular, to rate control for data transmission over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that performs rate control for real-time communications ("RTC"). The system establishes a tunnel by a tunneling server with a tunneling client of a user equipment ("UE"). The system receives a request from the UE to enable the rate control for an inner socket of the tunnel, and sends a response back to the UE to indicate that the rate control is enabled for the inner socket. The system then monitors a transmission rate at the inner socket of the tunnel, and drops frames when the monitored transmission rate is greater than a predetermined transmission rate.

DETAILED DESCRIPTION

One embodiment performs rate control for data transmitted over a tunnel as encapsulated traffic. The transmission rate is limited on a per inner socket basis using application program interfaces, and can function at both the client and the server that established the tunnel (i.e., full-duplex).

Figure 1:
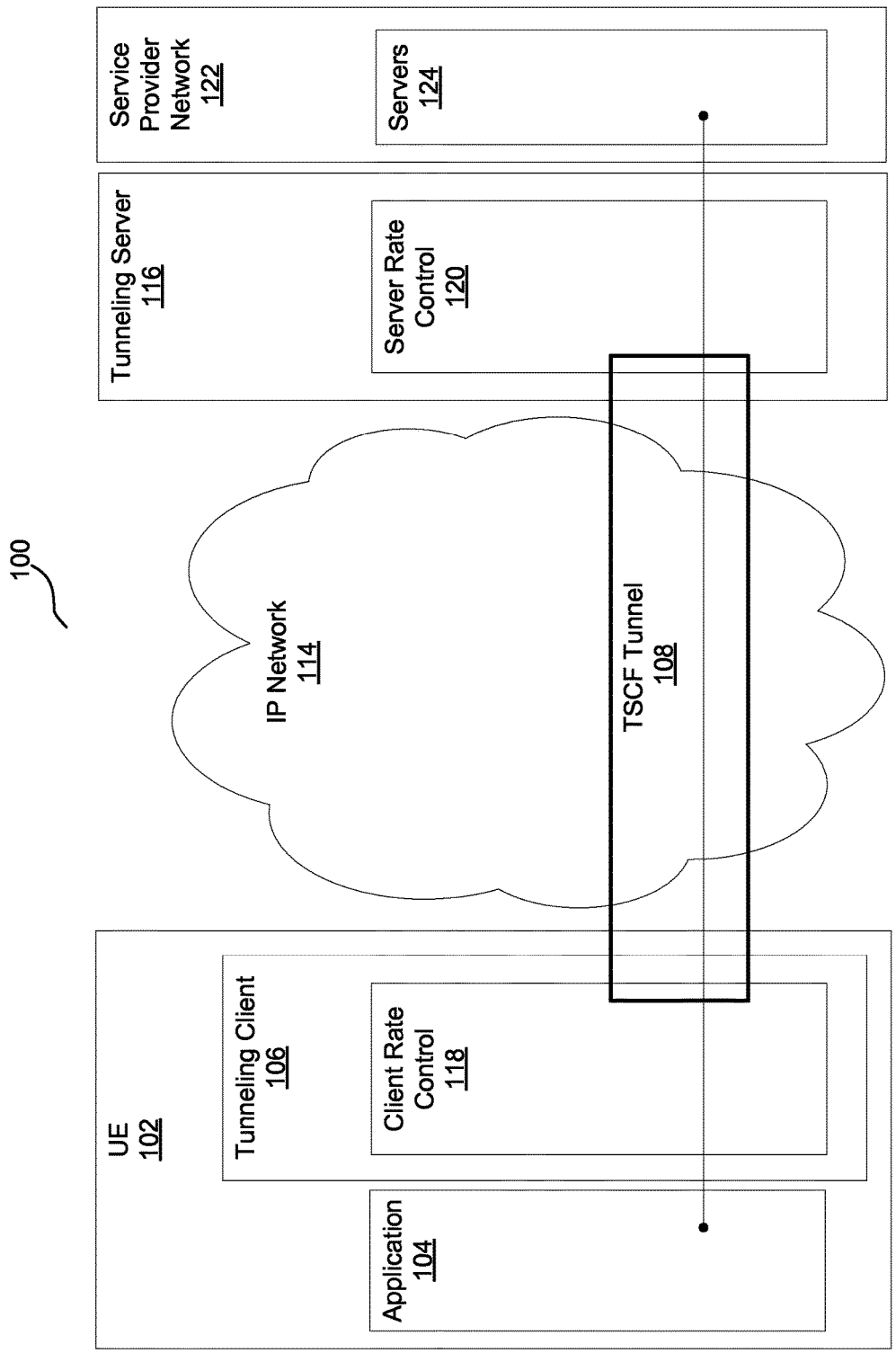
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the internet. The session border controllers (e.g., implemented by tunneling server 116) at the edge of the network terminate and control the tunnels before passing the secure traffic into the service core.

Figure 2:
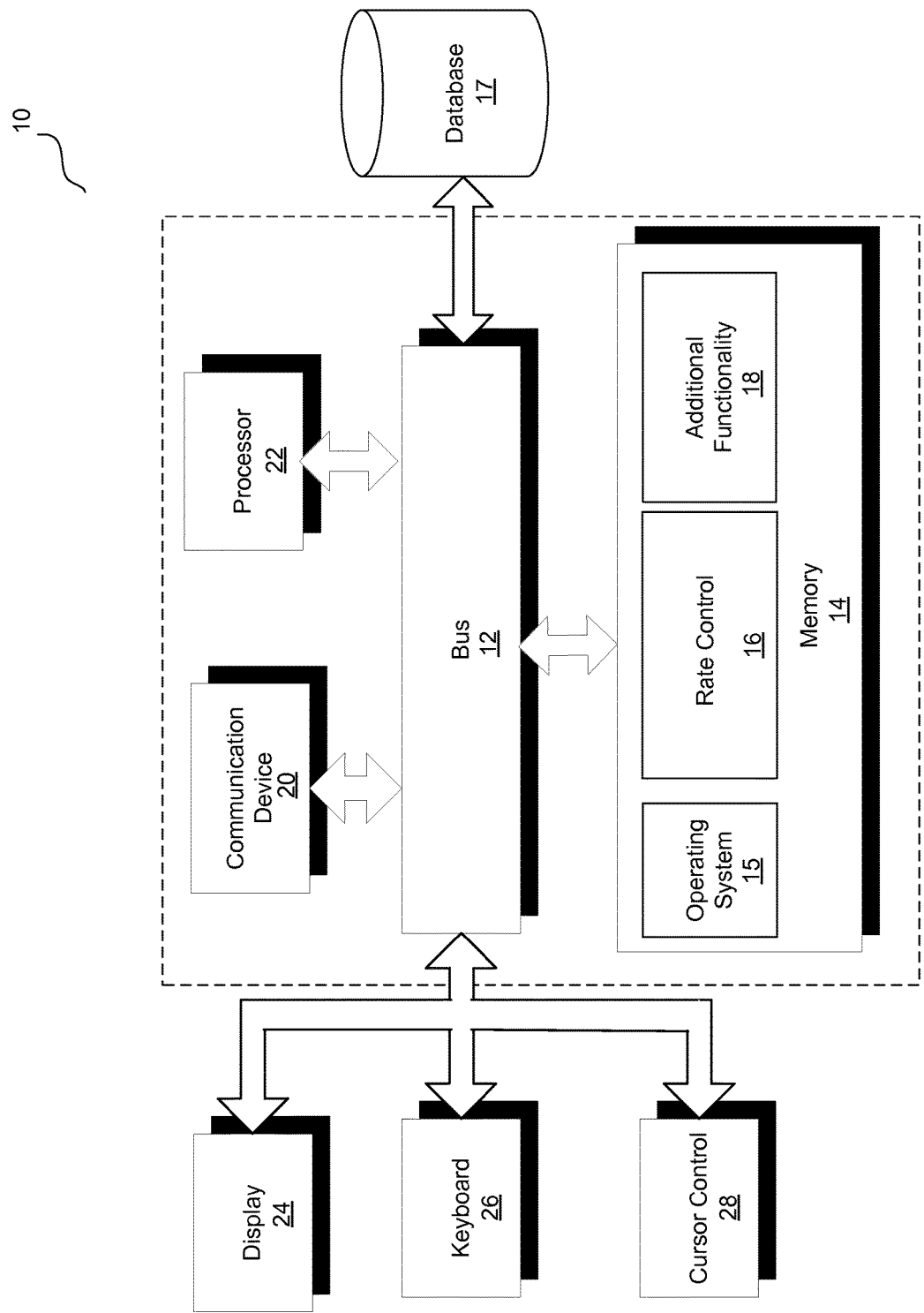
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a rate control module 16 for providing rate control for data transmission using a tunnel, and all other functionality disclosed herein. In one example embodiment, rate control module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for rate control module 16 and additional functional modules 18.

In one embodiment, rate control module 16 and/or additional functional modules 18 may include several modules to provide rate control functionality. The modules in one embodiment include a tunneling module that establishes a tunnel with a tunneling client of a user equipment and a monitoring module that monitors transmission rate conditions and executes the rate control functionality at an inner transport layer of the tunnel.

Referring again to FIG. 1, with known systems, TSCF tunnel 108 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated media is typically communicated according to the real-time transport protocol ("RTP" as provided, for example, in IETF RFC 3550).

Figure 3:
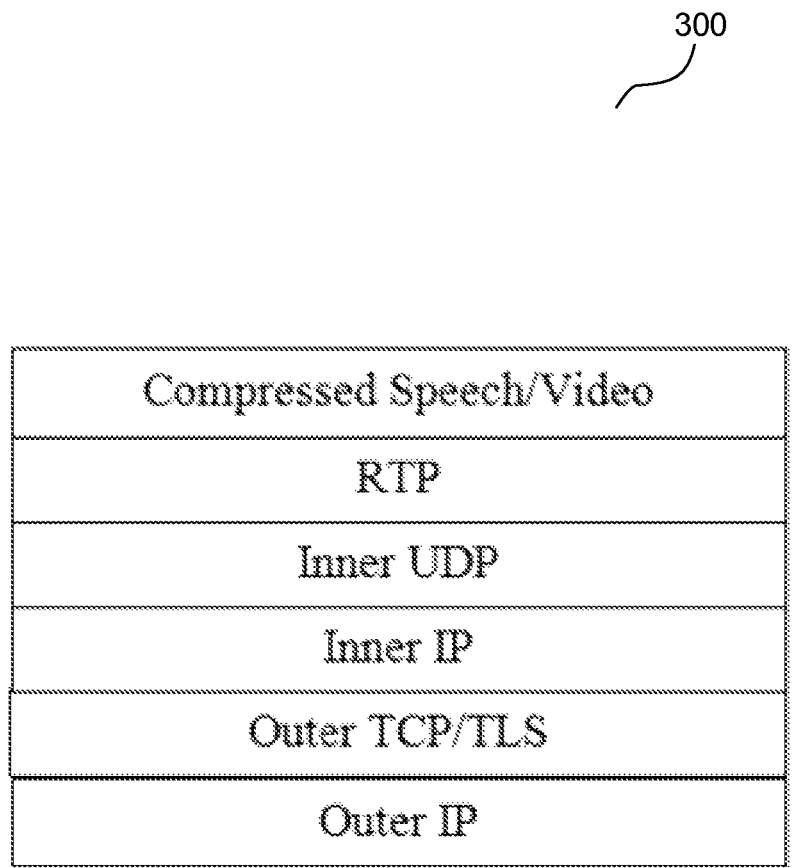
FIG. 3 illustrates example protocol layers in a tunneling configuration for encapsulating media traffic according to an embodiment.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

In packet switching networks, such as network 100 of FIG. 1, that become congested, traffic may be dropped at both the end nodes and intermediate nodes, as the nodes' outgoing and incoming frame queues become full due to lack of processing resources. Embodiments, through functionality implemented by client rate control module 118 by itself, in a half-duplex implementation, or also by a server rate control module 120, in a full-duplex implementation, minimize the congestion using rate control, so that specific streams are limited to preconfigured transmission rates in order to decrease the amount of data present at each node. In the context of the TSCF tunneling framework, encapsulated streams are generated through the use of inner sockets that are typically responsible of latency sensitive media such as speech and video as well as integrity dependent data. Embodiments provide rate control of encapsulated traffic using APIs that limit the transmission rate on a per inner socket basis. Once rate control is enabled, it is performed transparently without intervention of application 104 and efficiently controlled by the transport layers of the tunneling architecture.

In one embodiment, one or both of client rate control module 118 and server rate control module 120 inspect encapsulated traffic established by an inner socket in TSCF tunnel 108 to track the traffic rate and enable rate control if necessary. A network socket is an endpoint of an inter-process communication flow across a computer network according to a communications protocol. A network socket may be a datagram socket (a connectionless network socket) or a stream socket (a connection-oriented and sequenced socket). In general, for regular communications, a user can create a datagram or stream socket that uses the network interface of the system in which the application runs. In a TSCF environment, however, sockets use a tunnel for transport instead of a network interface. To differentiate these sockets from regular sockets, they are referred to as "inner sockets" since they only exist inside a tunnel. That is, an inner socket only exists in association with a tunnel, and socket traffic gets transported by the tunnel.

One embodiment provides TSCF SDKs that support an application programming interface ("API") so that application 104 can enable rate control functionality for an inner socket. For example, application 104 may enable rate control at tunneling client 106 for an inner socket by executing a corresponding "tsc_setsockopt" API (i.e., a set socket API) with a corresponding socket option when an inner socket is created. The TSCF SDK provides a Berkeley software distribution ("BSD")-like socket API that can be used to send and receive encapsulated media using the tsc_sendto and tsc_recvfrom functions, respectively.

In one embodiment, each inner socket supports a maximum transmission rate, when configured, at both tunneling client 106 and tunneling server 16. The rate control may be settable as either half-duplex or full-duplex. Further, in one embodiment a new socket option is added to the "tsc_setsockopt" API to set a maximum transmission rate in order to support rate control.

In one embodiment, if needed and once enabled, tunneling client 106 can communicate with tunneling server 116 via CM transactions to set the maximum transmission rate for the specific socket under consideration. Further, both tunneling client 106 and tunneling server 116 may selectively drop inner packets to warrantee the desired transmission rate.

Further, in one embodiment, the "tsc_sendto" API must return an error if it is not possible to send packets due to rate control limitations. Whenever the maximum transmission rate is achieved on a given socket, tunneling client 106 notifies application 104, if configured, by means of the "tsc_notification_enable" API.

Figure 4:
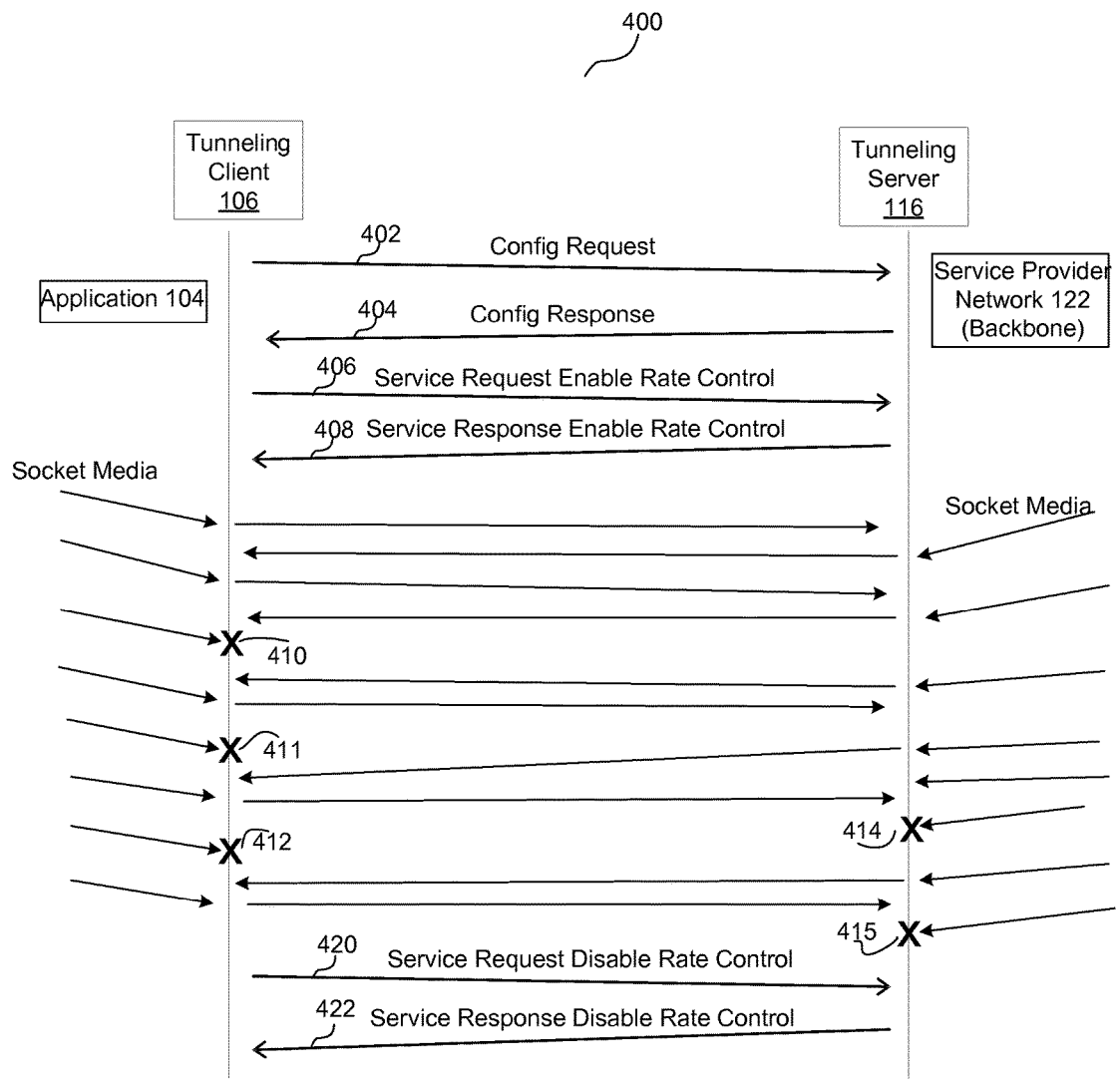
FIG. 4 is an example message sequence diagram including the sequence of messages exchanged between a tunneling client and a tunneling server for performing rate control according to some embodiments.

FIG. 4 is an example message sequence diagram 400 including the sequence of messages exchanged between tunneling client 106 and tunneling server 116 for performing rate control at tunneling client 106 and tunneling server 116, according to some embodiments. FIG. 4 includes network elements such as tunneling client 106 in communication with application 104, and tunneling server 116 in communication with service provider network 122, as described herein with reference to FIG. 1.

At 402, tunneling client 106 sends a configuration request message to tunneling server 116 to establish TSCF tunnel 108, and at 404 tunneling server 116 responds to the configuration request message of tunneling client 106 with a configuration response message. Configuration request and response messages allow for tunneling client 106 to obtain configuration information for TSCF tunnel 108 from tunneling server 116, as described in, for example, 3GPP TR 33.830 V0.5.0. In one embodiment, from the application perspective, application 104 at UE 102 creates TSCF tunnel 108 by executing a "tsc_ctrl_new_tunnel" API, and the configuration response message is sent to tunneling server 116 in response to the execution of this API.

Upon completing the exchange of request/response messages, tunneling client 106 and tunneling server 116 may use TSCF tunnel 108 for performing RTC and communicating signaling traffic and media traffic. In one embodiment, when inner signaling and media sockets are needed to place a call (e.g., for communicating SIP call control traffic or RTP media traffic), application 104 creates these sockets on TSCF tunnel 108 by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

At 406, application 104 enables rate control functionality for a specific transmission rate for an inner socket in TSCF tunnel 108 by executing a "tsc_setsockopt" API (indicating the transmission rate in bits per second ("bps")) on the corresponding inner socket. The execution of a "tsc_setsockopt" API causes client rate control module 118 to send a TSCF service request message to tunneling server 116 to enable rate control functionality for the inner socket at tunneling server 116 if the transmission rate is set as full-duplex.

At 408, if full-duplex, server rate control module 120 at tunneling server 116 receives the service request message, determines if tunneling server 116 can comply with the request, and answers back to client rate control module 118 with a TSCF service response message to confirm that rate control functionality is enabled.

Subsequently, tunneling client 106 transmits socket media received from application 104 over tunnel 108, and tunneling server 116 transmits socket media received from network/backbone 122 over tunnel 108. When application 104 sends frames of data using the "tsc_sendto" API, they are received and dropped by tunneling client 106 (e.g., at 410, 411 and 412), if needed, in order to guarantee the desired transmission rate and the function returns an error code to inform application 104. When tunneling server 116 receives frames from network 122, they are dropped if needed (e.g., at 414 and 415) to guarantee transmission rate in the case of full-duplex rate control.

In order to disable rate control, application 104 executes a tsc_setsockopt API (indicating a transmission rate of 0 bps) on the socket of interest. If rate control was initially set at full-duplex, at 420 tunneling client 106 issues another service request to comply and at 422 tunneling server 116 responds back with the corresponding service response.

One embodiment supports rate control by providing a "Service_Type" TLV value to indicate transmission rate control support, and by providing a "Connection_Info" TLV value to indicate source and destination transport and network endpoints. One embodiment further provides a "Rate" TLV value to indicate the transmission rate to be enforced and a "Duplex" TLV value to indicate whether the transmission is half or full-duplex. Table 1 below provides example TSCF TLVs for providing rate control functionality according to some embodiments.

int result=tsc_setsockopt(rtp_socket, SOL_SOCKET, SO_TSC_RATE_CONTROL,
    (char *)&rc, sizeof(tsc_rate_control));
where the "tsc_rate_control" API structure has two members: (1) "rate" that indicates the maximum transmission rate to be enabled and measured in bps; and (2) "duplex" that signals whether half or full-duplex is requested. A rate value of 0 disables rate control on the corresponding socket.

If the "tsc_setsockopt" API returns "−1", the option was not set correctly. If it returns "0" it was set correctly and although half-duplex support is enabled, full-duplex support is not completely enabled until it is negotiated. If full-duplex support cannot be negotiated, only half-duplex support is available. In one embodiment, a "tsc_notification_rate_control" API can be used to notify the client about this negotiation. The following pseudo-code illustrates how the notification is enabled and what the notification callback function looks like:

```
tsc_notification_enable(handle, tsc_notification_rate_control,
rate_control_notification, NULL);
void rate_control_notification(tsc_notification_data *notification)
{
    tsc_notification_rate_control_info_data *rate_control_data =
(tsc_notification_rate_control_info_data *)notification->data;
    if (rate_control_data && rate_control _data->available ==
    tsc_bool_true) {
        if (rate_control _data->enabled == tsc_bool_true) {
            printf("rate_control enabled notification on socket %d\n",
                rate_control_data->socket);
        } else {
            printf("rate_control notification playing on socket %d\n",
                rate_control _data->socket);
        }
    } else {
        printf("rate_control notification not allowed on socket %d\n",
            rate_control _data->socket);
    }
}
```

The fourth NULL parameter in the "tsc_notification_enable" API is an opaque/private data pointer that can be recovered in the "tsc_notification_data" API structure upon callback.

One embodiment that is implemented using an SBC, such as the Acme Packet 4600 from Oracle Corp., provides a

TABLE 1

| TLV TYPE | | | SHORT/ | VALUE | | |
|---|---|---|---|---|---|---|
| NAME | VALUE | SEMANTICS | LONG FORMAT | TYPE | LENGTH | NOTES |
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Rate Control = 40 |
| Rate | 36 | Rate (bps) | Short | Unsigned integer | 4 bytes | Value from 0 to 2^32 0 to disable |
| Duplex | 37 | Full/Half | Short | Unsigned integer | 1 byte | Half = 0 Full = 1 |

As disclosed above, in one embodiment rate control is requested by application 104 via "tsc_socket" APIs, more specifically by setting the appropriate socket option as shown in the following example pseudo-code:

tsc_rate_control rc;

rc.rate=64000;

rc.duplex=tsc_rate_control_duplex_full;

configuration object "tscf-interface" that includes a parameter "assigned-services" with a keyword "RC" to enable full-duplex rate control at tunneling server 116. Table 2 below provides an example of the tscf-interface configuration object according to one embodiment. For half-duplex rate control, as disclosed above, rate control is provided entirely by SDK APIs, so settings to tunneling server 116 do not apply.

TABLE 2

| Parameter Name | Extensible markup language ("XML") tag | Data Type and Default | Value Ranges/ Possible Values | Required or Optional (for feature to work)? |
|---|---|---|---|---|
| assigned-services | assigned-services | String: Blank | "RC" to enable full-duplex rate control | Optional |

The following functionality provides an example interface configuration for providing rate control according to one embodiment:
  tscf-interface
    realm-id access
    state enabled
    max-tunnels 200
    local-address-pools lp-1
    assigned-services SIP,RC
  tscf-port
    address 192.168.1.10
    port 2105
    transport-protocol TCP
    tls-profile
    rekey-profile The following is an example extensible markup language ("XML") functionality for providing rate control according to one embodiment:
  <tscfInterface realmID='access'
    state='enabled'
    maxTunnels='200'
    assignedServices='SIP,RC'
    options=''
    objectId='51'>
    <key>access</key>
    <localAddressPool name='lp-1'>
    <tscfPort address='192.168.1.10'
      port='2105'
      transProtocol='TCP'
      tlsProfile=''
      rekeyProfile=''
  </tscfInterface>

In one embodiment, for full-duplex mode, both tunneling client 106 (via client rate control module 118) and tunneling server 116 (via server rate control module 118) keep track of the transmission rate per traffic direction for each of the sockets that are subjected to rate control. Specifically, whenever a new frame is sent out, the internal variable "rate" is updated according to an exponential moving average as follows, and is based on an $\alpha$ (also referred to as "alpha" or "update") variable and a sampledRate variable:

$$rate = (1-\alpha) \times rate + \alpha \times sampledRate$$

where $\alpha$ controls how fast the transmission rate is updated and $$sampledRate = \frac{frameSize}{\Delta}$$

is calculated as the ratio between the frame size (frameSize in bits) and the time elapsed since the last transmission ($\Delta$ in seconds). In one embodiment, for a good compromise between stability and fast reaction, $\alpha=0.4$.

In one embodiment, if tunneling client 106 is to transmit a frame, the instantaneous and updated rate must be below the desired transmission rate preconfigured via the "tsc_setsockopt" API for the frame to be sent. If it is not because the updated rate is above the desired transmission rate, the "tsc_sendto" API will return an error. Similarly, in one embodiment, if tunneling server 116 is to transmit a frame, the instantaneous and updated rate must be below the desired transmission rate preconfigured via the tsc_setsockopt API for the frame to be sent.

The following pseudo-code describes the rate control functionality on both tunneling client 106 and tunneling server 116 in one embodiment:
  initial conditions:
    t=time( );
    alpha=0.4;
    rateControl=64000;
    sendFrame(frame, len):

```
sampleRate = len / time( ) - t;
rate = (1 - alpha)*rate + alpha*sampleRate;
if (rate <= rateControl)
    send(frame, len);
    t = time( );
else
    drop(frame, len);
endif
```

Given initial conditions, including the predefined transmission rate control threshold set as 64 kbps in this example, the "sendFrame" function can be used to send traffic accordingly. The "time( )" function provides the system time in milliseconds and the functions "send" and "drop" are used to transmit or not transmit traffic, respectively.

Figure 5:
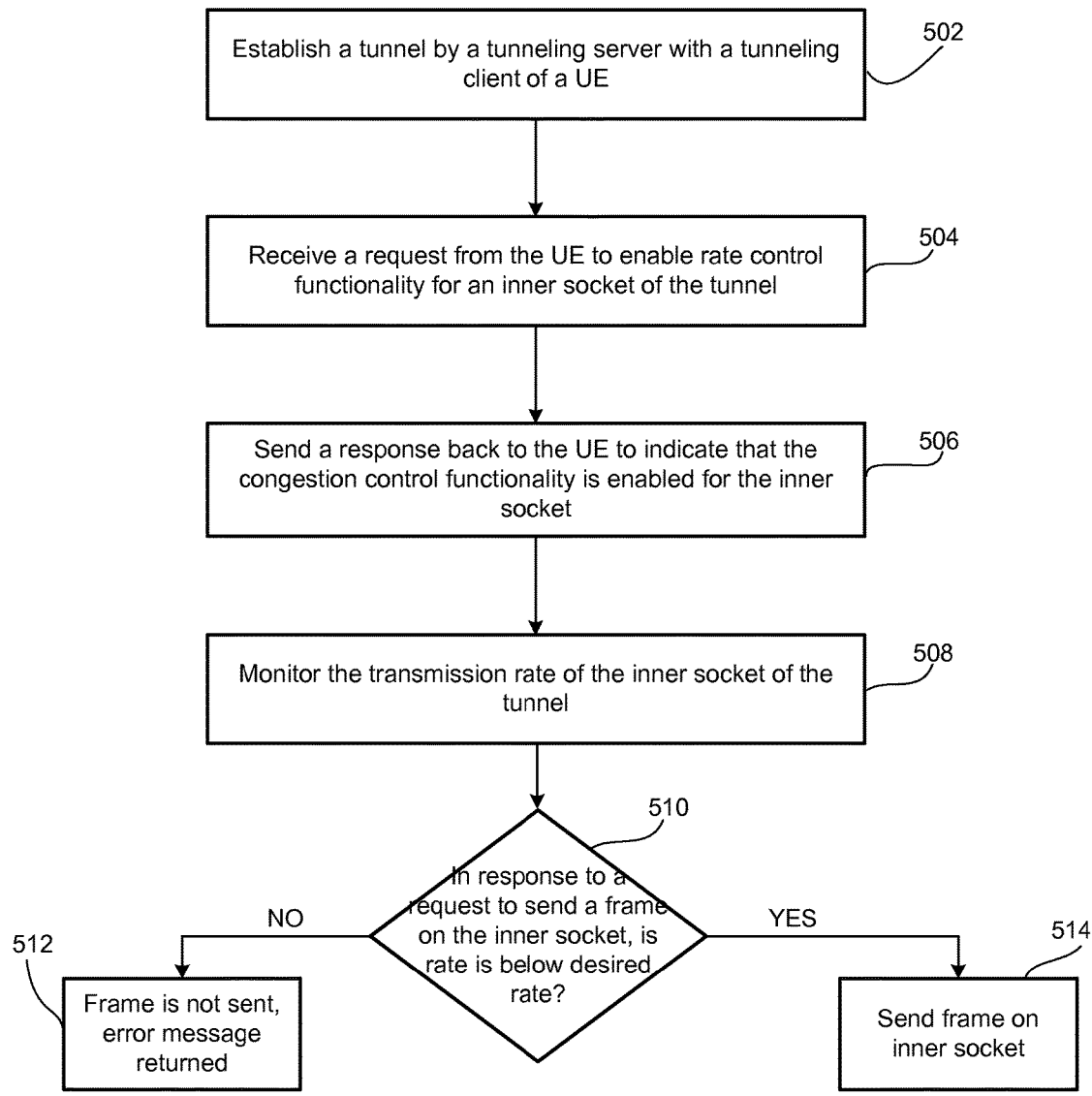
FIG. 5 is a flow diagram of a rate control module of FIG. 2 and/or a tunneling client and tunneling server of FIG. 1 when performing rate control in accordance with embodiments of the present invention.

FIG. 5 is a flow diagram of rate control module 16 of FIG. 2 and/or tunneling client 106 and tunneling server 116 of FIG. 1 when performing rate control in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, tunneling client 106 and tunneling server 116 establish TSCF tunnel 108.

At 504, client rate control module 118 at tunneling client 106 sends a TSCF service request to tunneling server 116 to enable rate control functionality for an inner socket in TSCF tunnel 108. In one embodiment, client rate control module 118 sends the request when application 104 executes an API to enable the rate control functionality for the inner socket.

At 506, with full-duplex implementation, server rate control module 120 at tunneling server 116 sends a TSCF service response back to client rate control module 118 to confirm that rate control functionality is enabled for the inner socket.

At 508, client rate control module 118 and server rate control module 120 (for full-duplex implementation) monitor the transmission rate per traffic direction for the inner socket of TSCF tunnel 108 that is subject to rate control.

At 510, client rate control module 118 and server rate control module 120 (for full-duplex implementation), before sending a frame on the inner socket in response to a request to send a frame, determine if the instantaneous and updated rate is below the desired transmission rate. If not at 510, at 512 the frame will not be sent (i.e., the frame is dropped) and an error message will be returned. If yes at 510, at 514 the frame will be sent on the inner socket.

As disclosed, embodiments establish a tunnel and then monitor the transmission rate of an inner socket for the tunnel. Thereafter, when receiving a request to send a frame on the inner socket, the frame will only be sent if the monitored transmission rate is below a desired transmission rate. Otherwise, the frame will be dropped. The rate control, once enabled, is performed without further intervention or participation of the application that requested and enabled the rate control. Instead, the tunnel architecture itself performs rate control.

As an example of when application 104 may enable the rate control, assume it is desired to transmit media (i.e., speech/video) and because of limited network resources the maximum tolerable transmission rate is 64 Kbps per stream (i.e., above this rate, losses occur). With embodiments of the invention, the rate control is placed at the transport layer, so when application 104 transmits media on the socket, embodiments will reject any media that exceeds this rate, forcing the encoder to react accordingly (i.e., immediate feedback).

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform rate control for real-time communications (RTC), the rate control comprising:
    establishing a tunnel by a tunneling server with a tunneling client of a user equipment (UE), wherein the tunnel comprises a plurality of inner sockets;
    receiving a request from the UE to enable the rate control for a first inner socket of the plurality of inner sockets of the tunnel;
    sending a response back to the UE to indicate that the rate control is enabled for the first inner socket;
    monitoring a transmission rate at the first inner socket of the tunnel, wherein the monitoring occurs on a per inner socket basis and the monitored transmission rate is the transmission rate of the first inner socket; and
    dropping a frame when the monitored transmission rate of the first inner socket is greater than a predetermined transmission rate;
    wherein the transmission rate of the first inner socket is determined by updating an internal variable rate when a new frame is sent on the first inner socket, the updating based on a ratio between a size of the new frame and a time elapsed since a previous transmission on the first inner socket of a previous frame.

2. The computer readable medium of claim 1, wherein the tunnel is configured according to a tunneled services control function (TSCF) standard, the request is a TSCF service request message, and the response is a TSCF service response message.

3. The computer readable medium of claim 1, wherein the UE sends the request when an application at the UE executes an application programming interface (API) to enable the rate control for the first inner socket.

4. The computer readable medium of claim 1, wherein the monitoring the transmission rate at the first inner socket of the tunnel occurs at the tunneling server.

5. The computer readable medium of claim 4, further comprising a full-duplex mode wherein the monitoring the transmission rate at the first inner socket of the tunnel further occurs at the tunneling client.

6. The computer readable medium of claim 1, wherein the monitoring the transmission rate at the first inner socket of the tunnel comprises updating a rate variable when a new frame is sent, the rate variable based on an update variable and a sampledRate variable, wherein the update variable controls a frequency that the transmission rate is updated and the sampledRate variable is a ratio between a frame size and a time elapsed since a last transmission.

7. The computer readable medium of claim 3, wherein the API comprises a set socket API on the first inner socket, and the API indicates the transmission rate.

8. A method for performing rate control for real-time communications (RTC), the method comprising:
    establishing a tunnel by a tunneling server with a tunneling client of a user equipment (UE), wherein the tunnel comprises a plurality of inner sockets;
    receiving a request from the UE to enable the rate control for a first inner socket of the plurality of inner sockets of the tunnel;
    sending a response back to the UE to indicate that the rate control is enabled for the first inner socket;
    monitoring a transmission rate at the first inner socket of the tunnel, wherein the monitoring occurs on a per inner socket basis and the monitored transmission rate is the transmission rate of the first inner socket; and
    dropping a frame when the monitored transmission rate of the first inner socket is greater than a predetermined transmission rate;
    wherein the transmission rate of the first inner socket is determined by updating an internal variable rate when a new frame is sent on the first inner socket, the updating based on a ratio between a size of the new frame and a time elapsed since a previous transmission on the first inner socket of a previous frame.

9. The method of claim 8, wherein the tunnel is configured according to a tunneled services control function (TSCF) standard, the request is a TSCF service request message, and the response is a TSCF service response message.

10. The method of claim 8, wherein the UE sends the request when an application at the UE executes an application programming interface (API) to enable the rate control for the first inner socket.

11. The method of claim 8, wherein the monitoring the transmission rate at the first inner socket of the tunnel occurs at the tunneling server.

12. The method of claim 11, further comprising a full-duplex mode wherein the monitoring the transmission rate at the first inner socket of the tunnel further occurs at the tunneling client.

13. The method of claim 8, wherein the monitoring the transmission rate at the first inner socket of the tunnel comprises updating a rate variable when a new frame is sent, the rate variable based on an update variable and a sampledRate variable, wherein the update variable controls a frequency that the transmission rate is updated and the sampledRate variable is a ratio between a frame size and a time elapsed since a last transmission.

14. The method of claim 10, wherein the API comprises a set socket API on the first inner socket, and the API indicates the transmission rate.

15. A tunneling server comprising:
    a processor; and a storage device coupled to the processor that stores a rate control module, the rate control module, when executed by the processor, implementing modules comprising:

a tunneling module that establishes a tunnel by a tunneling server with a tunneling client of a user equipment (UE), wherein the tunnel comprises a plurality of inner sockets, and, in response to receiving a request from the UE to enable rate control for a first inner socket of the plurality of inner sockets of the tunnel, sends a response back to the UE to indicate that the rate control is enabled for the first inner socket; and a monitoring module that monitors a transmission rate at the first inner socket of the tunnel, wherein the monitoring occurs on a per inner socket basis and the monitored transmission rate is the transmission rate of the first inner socket, and drops a frame when the monitored transmission rate of the first inner socket is greater than a predetermined transmission rate;

wherein the transmission rate of the first inner socket is determined by updating an internal variable rate when a new frame is sent on the first inner socket, the updating based on a ratio between a size of the new frame and a time elapsed since a previous transmission on the first inner socket of a previous frame.

16. The tunneling server of claim 15, wherein the tunnel is configured according to a tunneled services control function (TSCF) standard, the request is a TSCF service request message, and the response is a TSCF service response message.

17. The tunneling server of claim 15, wherein the UE sends the request when an application at the UE executes an application programming interface (API) to enable the rate control for the first inner socket.

18. The tunneling server of claim 15, wherein the monitoring the transmission rate at the first inner socket of the tunnel occurs at the tunneling server.

19. The tunneling server of claim 18, further comprising a full-duplex mode wherein the monitoring the transmission rate at the first inner socket of the tunnel further occurs at the tunneling client.

20. The tunneling server of claim 15, wherein the monitoring the transmission rate at the first inner socket of the tunnel comprises updating a rate variable when a new frame is sent, the rate variable based on an update variable and a sampledRate variable, wherein the update variable controls a frequency that the transmission rate is updated and the sampledRate variable is a ratio between a frame size and a time elapsed since a last transmission.

* * * * *